Dec. 1, 1942. F. M. BENDER 2,303,905
OPTICAL SYSTEM FOR DETERMINING THE COLOR OF INKS
Original Filed Sept. 9, 1937
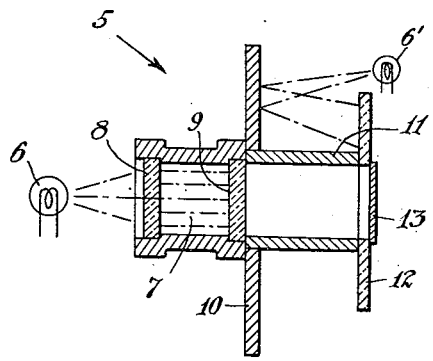
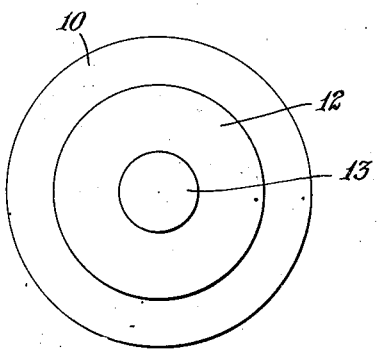
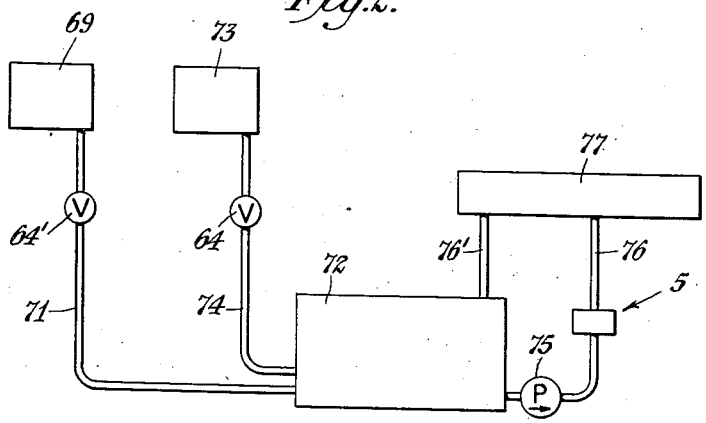
INVENTOR
FREDERICK M. BENDER
BY
ATTORNEYS Patented Dec. 1, 1942

2,303,905

UNITED STATES PATENT OFFICE 2,303,905

OPTICAL SYSTEM FOR DETERMINING THE COLOR OF INKS

Frederick M. Bender, East Orange, N. J., assignor to Speedry Gravure Corporation, New York, N. Y., a corporation of New York Original application September 9, 1937, Serial No. 163,021. Divided and this application August 2, 1940, Serial No. 349,389

2 Claims. (Cl. 88—14)

This invention relates to means for determining color intensity, and more particularly, to a mechanism whereby the intensity of color of the inks fed to printing presses may be determined and controlled within close limits. This is a division of my application Serial No. 163,021, filed September 9, 1937 (Patent No. 2,262,573, issued November 11, 1941).

In order to obtain a finished product of high quality in the color printing art, great care must be exercised to insure that the intensity of color of the inks used remains constant during the printing process. Inasmuch as the intensity of color of the inks varies during the operation, either additional ink or solvent must be added to restore the ink to the exact color intensity desired. This intensity of color heretofore has been usually determined by visual observation alone, and since the human eye is not sensitive to slight variations in color intensity and is variably sensitive to any variations, the method is generally unsatisfactory.

An object of my invention is to provide a greatly improved device by means of which slight changes in the intensity of color of the ink can be instantly detected and corrected.

The invention is attained by directing rays of light through a transparent chamber in which the colored ink flows. The light so transmitted is passed through a complementary color filter with the result that changes in the intensity of color of the ink appear as changes in the intensity of the light emanating from the color filter. By comparing the filtered light with light of a standard intensity, changes in color intensity of the ink may be instantly detected and corrected.

Additional objects will be readily apparent from the following detailed description and from the accompanying drawing, wherein Figure 1 is a view in vertical section of a device constructed in accordance with this invention;

Fig. 1a is an end view of the device shown in Fig. 1; and

Figure 2 is a diagram illustrating the component parts of the system by means of which ink may be supplied to a printing press in accordance with the present invention.

Referring to Figure 1, the comparison device is designated by the number 5 and comprises a lamp 6 and a chamber 7 through which the ink supply to the fountain flows. The sides 8 and 9 of the chamber 7 are of a transparent material in order that light from the lamp 6 may be transmitted through the ink stream into a closed cylinder 11. At the open end of the cylinder 11 there is secured a translucent apertured disc 12, the aperture being covered by a light filter 13 which is complementary to the color of the ink flowing in the transparent chamber 7. With this construction any change in the intensity of color of the ink supply results in a variation in the intensity of the light beam emanating from the filter 13.

A circular reflector 10 is adapted to fit snugly against the chamber 7, and is formed with a circular aperture in which the cylinder 11 is received. Light from a lamp 6' impinges on the surface of the reflector 10 and is reflected to the translucent disc 12 which is so constructed that light passing through it is of the same intensity as light passing through the ink in the chamber 7 when the color intensity of the ink is correct. In this fashion, the disc 12 constitutes a standard of comparison against which the intensity of the light passing through the filter 13 can be checked.

If the ink in the chamber 7 becomes too light in color, the intensity of the light from the filter 13 will increase relative to the standard, so that a central region of relatively high intensity is observed against an outer region of lesser intensity. While the human eye is not sensitive to slight changes in color intensities, it is quite sensitive to slight variations in light intensity. This device, therefore, can be used with a high degree of effectiveness to visually indicate slight variations in the intensity of colors of inks. The variations in color can then be readily corrected by manually adding either more ink or an ink solvent.

As indicated in Figure 2 the ink system comprises an ink storage tank 69 connected to the supply tank 72 through a pipe 71 in which there is a valve 64'. A solvent storage tank 73 is likewise connected to the supply tank 72 by means of a pipe 74 in which there is connected the valve 64. The mixture of ink and solvent in the supply tank 72 is circulated by means of a pump 75 through a pipe 76, the ink fountain 77 and back to the supply tank 72 through a tube 76'. The device 5 above described is connected in the pipe 76 where it registers any changes in the intensity of color of the ink so that its color intensity may be brought back to normal by suitable operation of the valves 64 and 64'.

The device instantaneously registers any changes in the color intensity of the ink fed to the ink fountain so that more or less ink or solvent, as the case may be, can be fed thereto for the purpose of preserving a desired color intensity of ink. As a result of this invention, ink of constant color intensity may be readily and easily maintained over long periods of operation.

Inasmuch as, in commercial printing operations, an ingredient known as "extender" is used as well as solvent to maintain a desired uniformity of tone strength, it is understood that this invention contemplates such use, and, if desired, the addition of the extender may be determined as well as the solvent by means of this invention.

Since additional modifications are possible, it is to be understood that the above specification is presented only as descriptive of the invention, and the latter is to be in no way limited thereby save as defined in the appended claims.

I claim:

1. A color determining device for use in inking mechanisms for printing presses comprising a source of light of a plurality of wave lengths, an ink chamber having a pair of parallel transparent sides through which the said light may be transmitted, an open ended chamber disposed to receive light at one end thereof through said ink chamber, a color filter at the other open end of the said chamber complementary to the color of the ink, a translucent member surrounding said filter in lateral confining relation, and means to transmit light rays of a standard color and intensity through said translucent member, so that the rays of light passed through the filter are surrounded by adjacent rays of a standard color and intensity whereby changes in the intensity of the filtered light may be readily observed.

2. A color determining device for use in inking mechanisms for printing presses comprising a source of light of a plurality of wave lengths, an ink chamber having a pair of transparent sides through which the said light may be transmitted, an open ended chamber disposed to receive light at one end thereof through said ink chamber, a color filter at the other end of the said chamber complementary to the color of the ink to absorb certain of the said wave lengths, a translucent apertured disc disposed axially on said chamber at the outer end thereof and in substantial alignment with said filter, a second source of light and means to direct light from said second source through said translucent disc in substantially the same direction the light waves are transmitted through said filter.

FREDERICK M. BENDER.